United States Patent
Gauthier et al.

(10) Patent No.: US 7,376,855 B1
(45) Date of Patent: May 20, 2008

(54) FULLY STABLE CLOCK DOMAIN SYNCHRONIZATION TECHNIQUE FOR INPUT/OUTPUT DATA TRANSMISSION

(75) Inventors: Claude R. Gauthier, Cupertino, CA (US); Aninda K. Roy, Hillsboro, OR (US)

(73) Assignee: Sun Microsystems, Inc., Santa Clara, CA (US)

( * ) Notice: Subject to any disclaimer, the term of this patent is extended or adjusted under 35 U.S.C. 154(b) by 502 days.

(21) Appl. No.: 10/849,760

(22) Filed: May 20, 2004

(51) Int. Cl.
*G06F 1/12* (2006.01)
*H04L 7/00* (2006.01)

(52) U.S. Cl. ..................... 713/400; 375/368
(58) Field of Classification Search ............... 713/400; 375/368
See application file for complete search history.

(56) References Cited

U.S. PATENT DOCUMENTS

| | | | |
|---|---|---|---|
| 6,714,612 B1 * | 3/2004 | Chaudry | 375/368 |
| 6,928,573 B2 * | 8/2005 | Wong | 713/500 |
| 6,970,049 B1 * | 11/2005 | Hipp | 331/74 |
| 7,120,216 B2 * | 10/2006 | Shirota et al. | 375/373 |
| 2003/0081713 A1 * | 5/2003 | Pontius et al. | 375/372 |
| 2004/0027166 A1 * | 2/2004 | Mangum et al. | 326/93 |

\* cited by examiner

*Primary Examiner*—A. Elamin
*Assistant Examiner*—Fahmida Rahman
(74) *Attorney, Agent, or Firm*—Osha•Liang LLP

(57) ABSTRACT

Input/output data transmission between a transmitting integrated circuit and a receiving integrated circuit requires a clock domain synchronizer to synchronize incoming data aligned to a clock signal of the transmitting integrated circuit to a clock signal of the receiving integrated circuit. During a start-up routine, the clock domain synchronizer propagates a pre-determined pattern of data bits through a first circuit path designed to reduce or eliminate metastability. During a normal operations mode, the clock domain synchronizer synchronizes the data signal to the clock signal of the receiving integrated circuit through a second circuit path.

21 Claims, 5 Drawing Sheets

FULLY STABLE CLOCK DOMAIN SYNCHRONIZATION TECHNIQUE FOR INPUT/OUTPUT DATA TRANSMISSION

BACKGROUND OF INVENTION

A typical computer system 10, as shown in FIG. 1, includes several components that are collectively used by a user to perform various functions such as, for example, preparing and generating a document with a word processor application. With the computer system 10, the user may input data to a computing portion 12 using peripheral devices such as a keyboard 14 or a mouse 16. Data may also be provided to the computing portion 12 using data storage media, e.g., a floppy disk or a CD-ROM (not shown). The computing portion 12, using memory and other internal components, processes both internal data and data provided to the computing portion 12 by the user to generate data requested by the user. The generated data may be provided to the user via, for example, a display device 18 or a printer 20.

The computing portion 12 of a computer system typically includes various components such as, for example, a power supply, disk drives, and the electrical circuitry required to perform the necessary and requested operations of the computer system. As shown in FIG. 2, the computing portion 12 may contain a plurality of circuit boards 22, 24, 26, 28 on which various circuit components are implemented. For example, a computing portion designed to have enhanced sound reproducing capabilities may have a circuit board dedicated to implementing circuitry that specifically operate to process data associated with the reproduction of sound.

In FIG. 2, the components of exemplary circuit board 22 are shown. A crystal oscillator 30 provides a reference of time to various integrated circuits (ICs) 32, 34, 36, 38, 40, 42 (e.g., application specific integrated circuits (ASICs), field-programmable gate arrays (FPGAs), microprocessors, and digital logic chips) that are connected onto the circuit board 22. The integrated circuits 32, 34, 36, 38, 40, 42 communicate with one another, i.e., pass data, using wires or traces of conductive material (e.g., copper) (shown, but not labeled) embedded in the circuit board 22.

SUMMARY OF INVENTION

According to one aspect of one or more embodiments of the present invention, a computer system comprises: a transmitting integrated circuit arranged to generate a data signal, the data signal being aligned with a first clock signal; and a receiving integrated circuit arranged to receive the data signal and the first clock signal, where the receiving integrated circuit has a clock domain synchronizer that comprises (i) a first circuit path arranged to input the data signal, synchronize the data signal with a second clock signal dependent on the first clock signal, and pass the synchronized data signal to an output of the clock domain synchronizer, and (ii) a second circuit path arranged to input the data signal and pass the data signal to the output dependent on the second clock signal.

According to another aspect of one or more embodiments of the present invention, a computer system comprises: means for transmitting a data signal and a first clock signal to which the data signal is aligned; and means for receiving the data signal and the first clock signal, where the means for receiving has a clock domain synchronizer that comprises (i) means for synchronizing the data signal to a second clock signal dependent on the first clock signal, and (ii) means for propagating the data signal to an output of the clock domain synchronizer dependent on the second clock signal, where the means for propagating is activated prior to entering a mode of operations in which the means for synchronizing is activated.

According to another aspect of one or more embodiments of the present invention, a method of performing computer system operations comprises: transmitting a data signal and a first clock signal to which the data signal is aligned; in a first mode prior to a second mode, propagating the data signal to an output node dependent on a second clock signal; and in the second mode, (i) synchronizing the data signal to the second clock signal dependent on the first clock signal and (ii) propagating the synchronized data signal to the output node.

Other aspects and advantages of the invention will be apparent from the following description and the appended claims.

DETAILED DESCRIPTION

Figure 1:
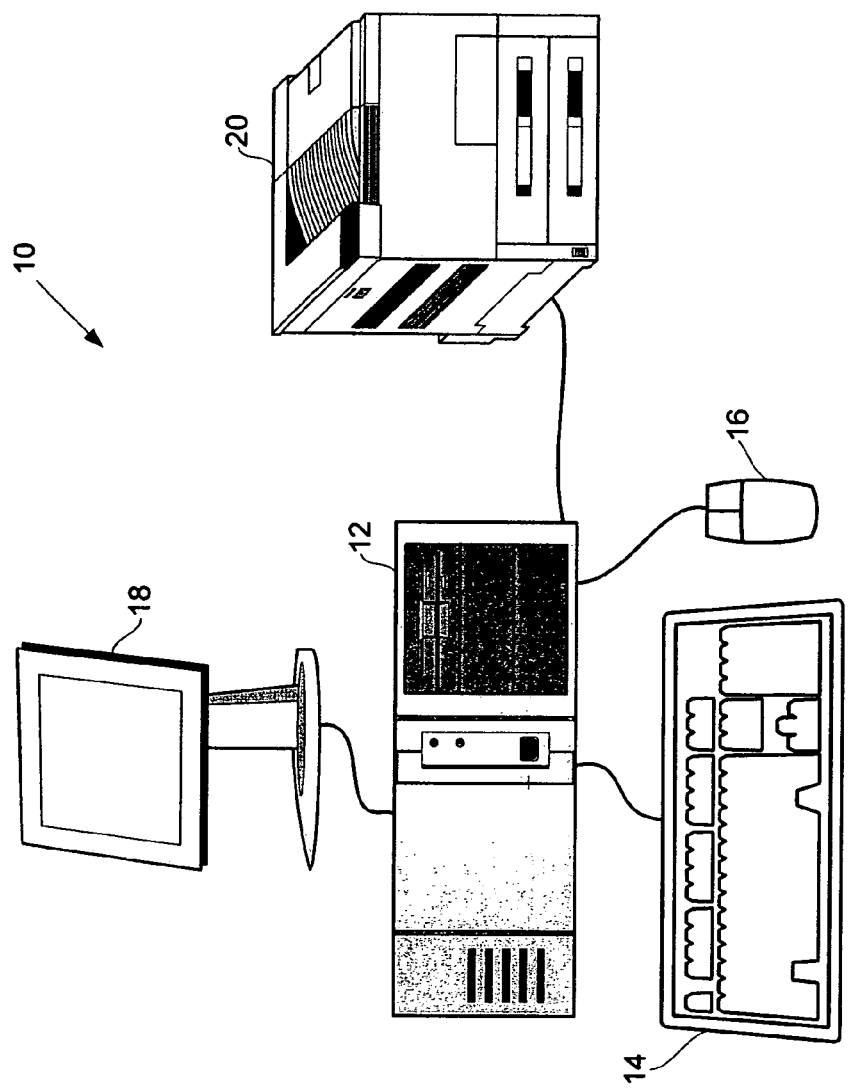
FIG. 1 shows a computer system.
Figure 2:
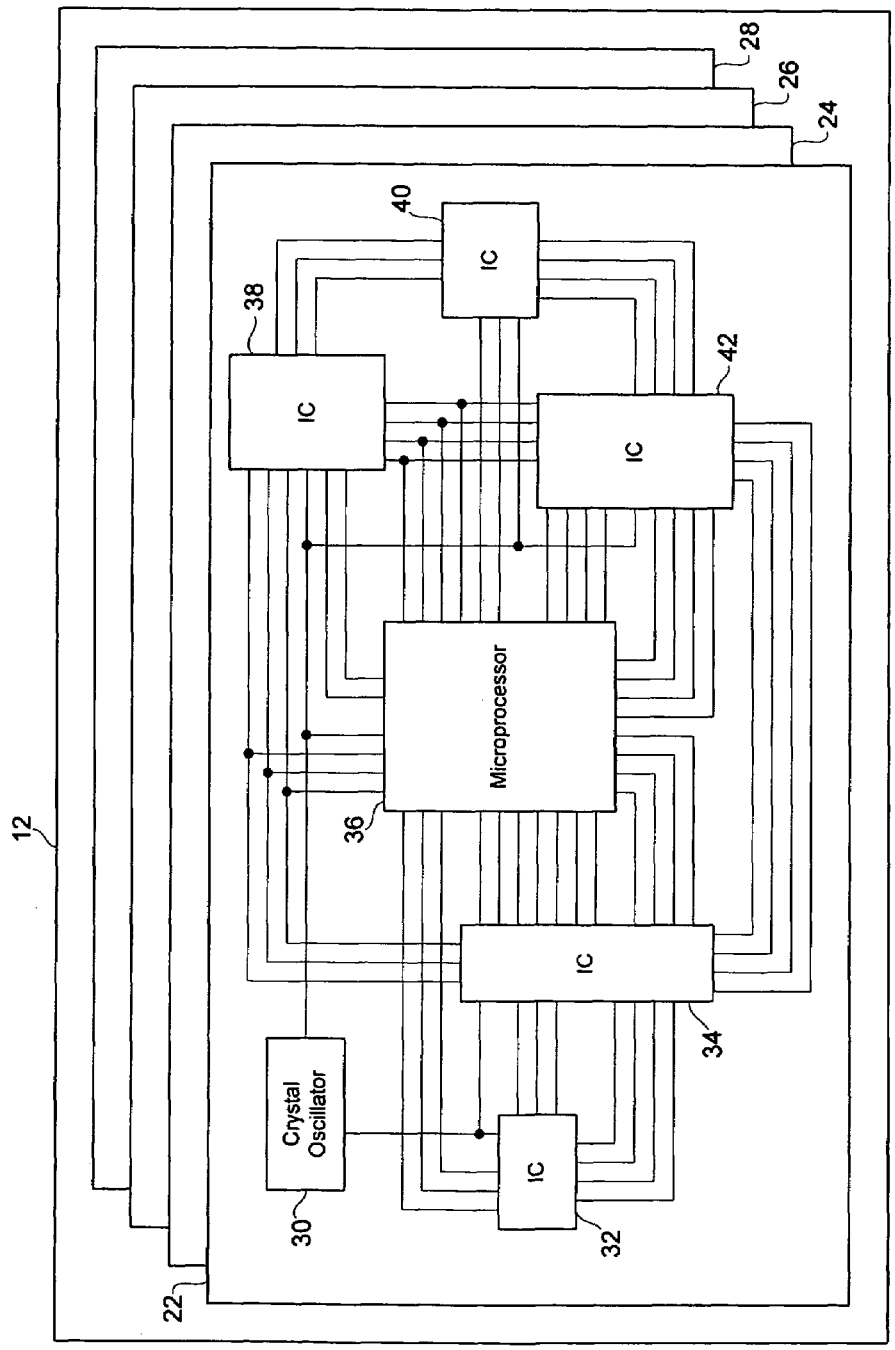
FIG. 2 shows components of a computer system.
Figure 3:
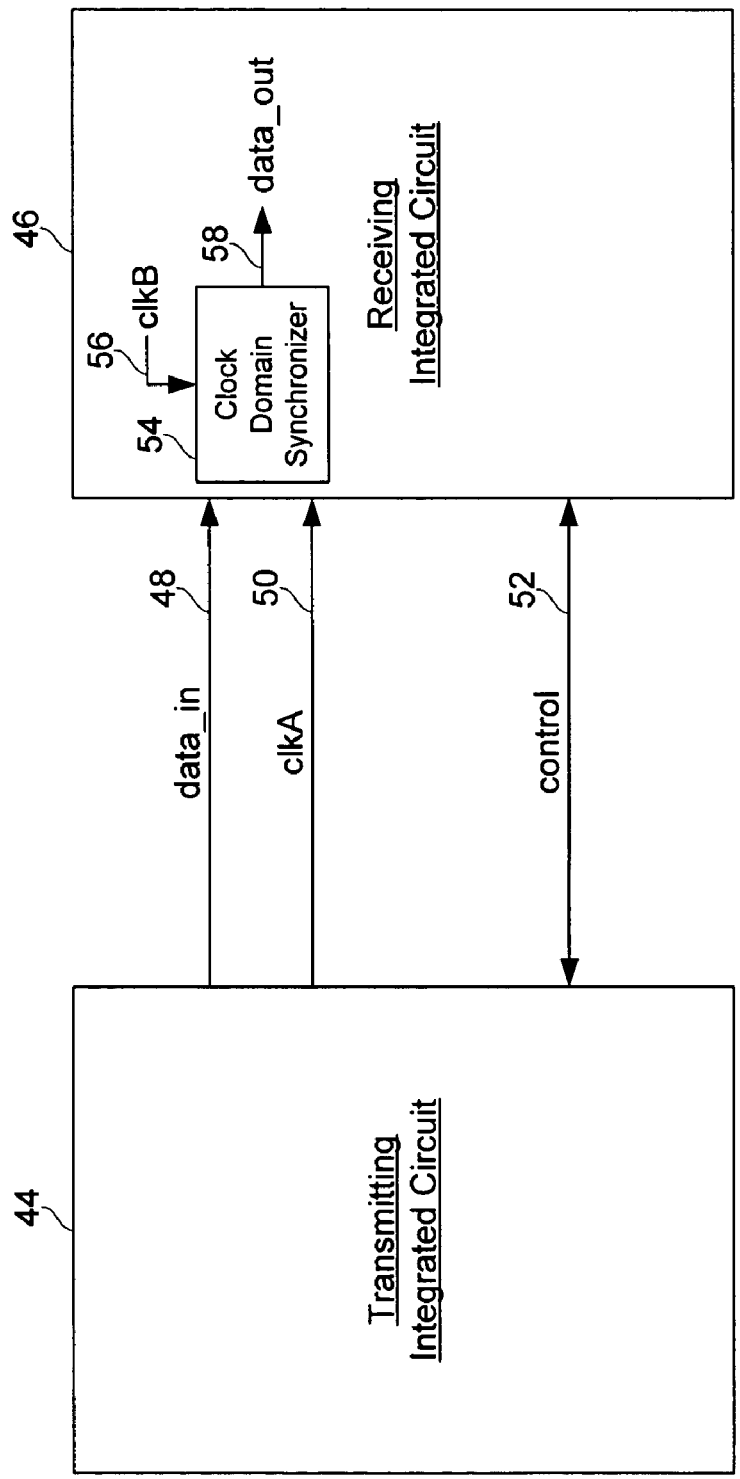
FIG. 3 shows an input/output transmission interface between a transmitting integrated circuit and a receiving integrated circuit.

Integrated circuits, such as those shown in FIG. 2, communicate with one another via input/output ("I/O") transmission interfaces that are designed to accurately and efficiently transmit data between integrated circuits. FIG. 3 shows a high-level diagram of an input/output transmission interface between a transmitting integrated circuit 44 and a receiving integrated circuit 46. Data generated by the transmitting integrated circuit 44 is prepared and readied for transmission as a data signal 48 that propagates to the receiving integrated circuit 46. A clock signal 59 is also sent with the data signal 48 in order to provide the receiving integrated circuit 46 with a reference of time to accurately recover the data signal 48. Such input/output transmission operations, in which output data is synchronized with a clock of the transmitting integrated circuit 44, are referred to as being "source-synchronous." Further, a control signal 52 may be provided to transmit control information between the transmitting integrated circuit 44 and the receiving integrated circuit 46.

In certain cases, the clock signal 50 to which the data signal 48 is aligned may have a frequency that is less than a frequency of the receiving integrated circuit 46. For example, in FIG. 3, the clock signal 50 sent from the transmitting integrated circuit 44 may have a frequency of 500 MHz, while the frequency of the receiving integrated circuit 46 is 1 GHz. Accordingly, the receiving integrated circuit 46 includes a clock domain synchronizer 54 that synchronizes the data signal 48 aligned with the clock signal 50 to a frequency of a clock signal 56 of the receiving integrated circuit 46. Thus, the clock domain synchronizer 54 generates a data signal 58 that is representative of the data signal 48 and synchronized with the receiving integrated circuit 46.

Figure 4:
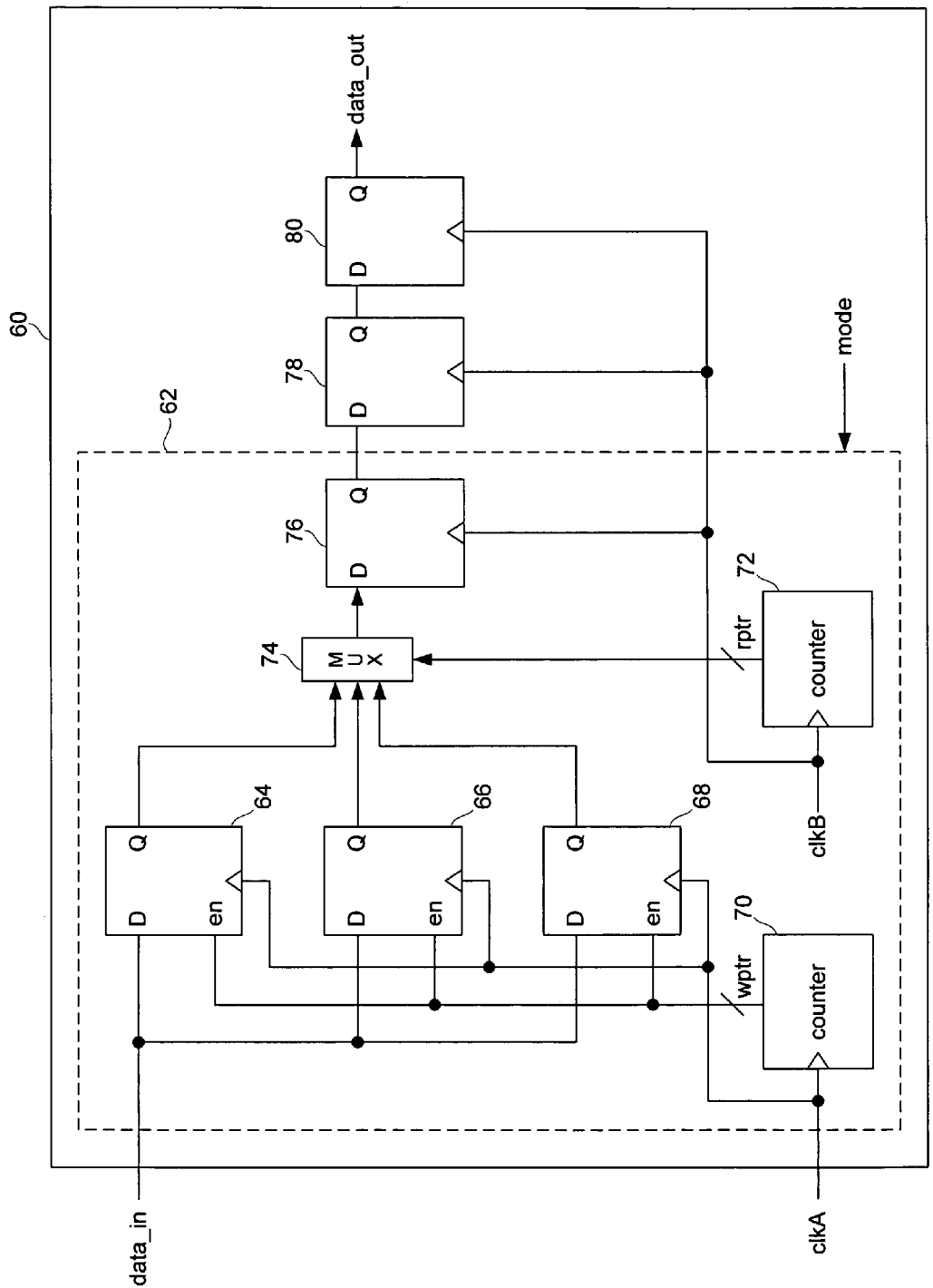
FIG. 4 shows a typical clock domain synchronizer.

FIG. 4 shows a receiving integrated circuit 60 having a typical clock domain synchronizer 62. The clock domain synchronizer 62 receives a data signal data_in transmitted from a transmitting integrated circuit (not shown). The clock domain synchronizer 62 also receives a clock signal clkA transmitted from the transmitting integrated circuit (not shown) and to which the data signal data_in is aligned.

The clock domain synchronizer 62 includes a set of flip-flops 64, 66, and 68 that each have a data input D connected to the data signal data_in. The set of flip-flops 64, 66, and 68 are clocked by the clock signal clka, which has a frequency of the transmitting integrated circuit (not shown).

Further, the set of flip-flops 64, 66, and 68 are each enabled by a corresponding signal on a "write pointer" bus wptr. The signals of the "write pointer" bus wptr are generated from a "write pointer" counter (e.g., a ring counter) 70 that is clocked by the clock signal clkA. More particularly, the signals of the "write pointer" bus wptr are each connected to a particular tap point (not shown) within the "write pointer" counter 70 (e.g., a particular tap being the output of a particular flip-flop within the "write pointer" counter 70). The "write pointer" counter 70 has a width equal to the number of flip-flops that input the data signal data_in and are clocked by the clock signal clkA. Accordingly, with respect to the clock domain synchronizer 62 shown in FIG. 4, the "write pointer" counter 70 is a 3-bit counter and the "write pointer" bus wptr has a width of three, i.e., the "write pointer" bus wptr is formed of three signals.

The outputs Q from the set of flip-flops 64, 66, and 68 serve as inputs to a multiplexor 74. The multiplexor 74 selects one of the outputs Q from the set of flip-flops 64, 66, and 68 dependent on a select input that is dependent on signals of a "read pointer" bus rptr. The signals of the "read pointer" bus rptr are generated from a "read pointer" counter (e.g., a ring counter) 72 that is clocked by a clock signal clkb, which has a frequency of the receiving integrated circuit 60. More particularly, the signals of the "read pointer" bus rptr are each connected to a particular tap point (not shown) within the "read pointer" counter 72 (e.g., a particular tap being the output of a particular flip-flop within the "read pointer" counter 72). The "read pointer" counter 72 has a width equal to the number of inputs to the multiplexor 74. Accordingly, with respect to the clock domain synchronizer 62 shown in FIG. 4, the "read pointer" counter 72 is a 3-bit counter and the "read pointer" bus rptr has a width of three, i.e., the "read pointer" bus rptr is formed of three signals.

The output of the multiplexor 74 serves as an input to a flip-flop 76 that is clocked by the clock signal clkb. An output from the flip-flop 76 serves as the output of the clock domain synchronizer 62.

The clock domain synchronizer 62 is operable in one of two modes of operation dependent on a mode signal mode. During a normal operations mode, the "read pointer" counter 72 is offset from the "write pointer" counter 70 by several clock cycles. Accordingly, at a particular point in time during normal operations, the "read pointer" bus rptr selects data, via multiplexor 74, from one of the flip-flops 64, 66, and 68 that was enabled by a signal of the "write pointer" bus wptr several cycles back.

On power-up of either the receiving integrated circuit 60 or the clock domain synchronizer 62, the clock domain synchronizer 62 enters a calibration mode of operation (also referred to as a "start-up" routine). In the calibration mode, the "write pointer" bus wptr and the "read pointer" bus rptr are initialized, i.e., set to 0. During the calibration mode, the transmitting integrated circuit (not shown) transmits a pre-determined pattern of bits on the data signal data_in to the receiving integrated circuit 60.

The pre-determined pattern of bits on the data signal data_in is passed through the clock domain synchronizer 62. When accurate passage of the pre-determined pattern of bits is verified at the output of the clock domain synchronizer 62, the "write pointer" counter 70 and the "read pointer" counter 72 are started. Once the "write pointer" counter 70 and the "read pointer" counter 72 are started, the clock domain synchronizer 62 may enter the normal operations mode described above.

The clock domain synchronizer 62 itself is stable by design only during the normal operations mode. During the calibration mode, because there is no offset between the "write pointer" counter 70 and the "read pointer" counter 72, the clock domain synchronizer 62 may enter a metastable state as described below.

A clocked flip-flop, such as flip-flop 76 shown in FIG. 4, is prone to metastability when a data or control input (e.g., data input D of flip-flop 76 shown in FIG. 4) is changing state at the instant of a clock pulse at the clock input of the flip-flop. The result is that the output (e.g., data output Q of flip-flop 76 shown in FIG. 4) may behave unpredictably, taking longer than normal amount of time to settle to its correct state, or, in some cases, oscillating several times before settling. Although in some designs, flip-flop metastability can be avoided by ensuring that the data input of the flip-flop is held constant for specified periods (e.g., set-up time and hold time) before and after the clock pulse, it is not always possible to ensure meeting the specified periods because the flip-flop may be operatively connected to a real-time signal that can change at any time (e.g., data signal data_in). Those skilled in the art will recognize that metastability can cause data corruption and/or circuit failure.

In order to guard against the adverse effects of metastability, the receiving integrated circuit 60 suppresses potential metastability of the clock domain synchronizer 62 using two flip-flops 78 and 80 connected in series and clocked by the clock signal clkB, where an input of the first flip-flop 78 is connected to the output from the clock domain synchronizer 62, and where the last flip-flop 80 outputs an output data signal data_out for use by components (not shown) of the receiving integrated circuit 60. However, those skilled in the art will recognize that although the series of flip-flops 78 and 80 may reduce the probability of an occurrence of a metastable event, this probability cannot be reduced to zero.

Further, the need for the series of flip-flops 78 and 80 to reduce metastability of the clock domain synchronizer 62 during the calibration mode increases the latency of operation during normal mode operations. Thus, potential metastability during the calibration mode and increased latency during normal mode operations possibly adversely effect the overall performance of the receiving integrated circuit 60.

Figure 5:
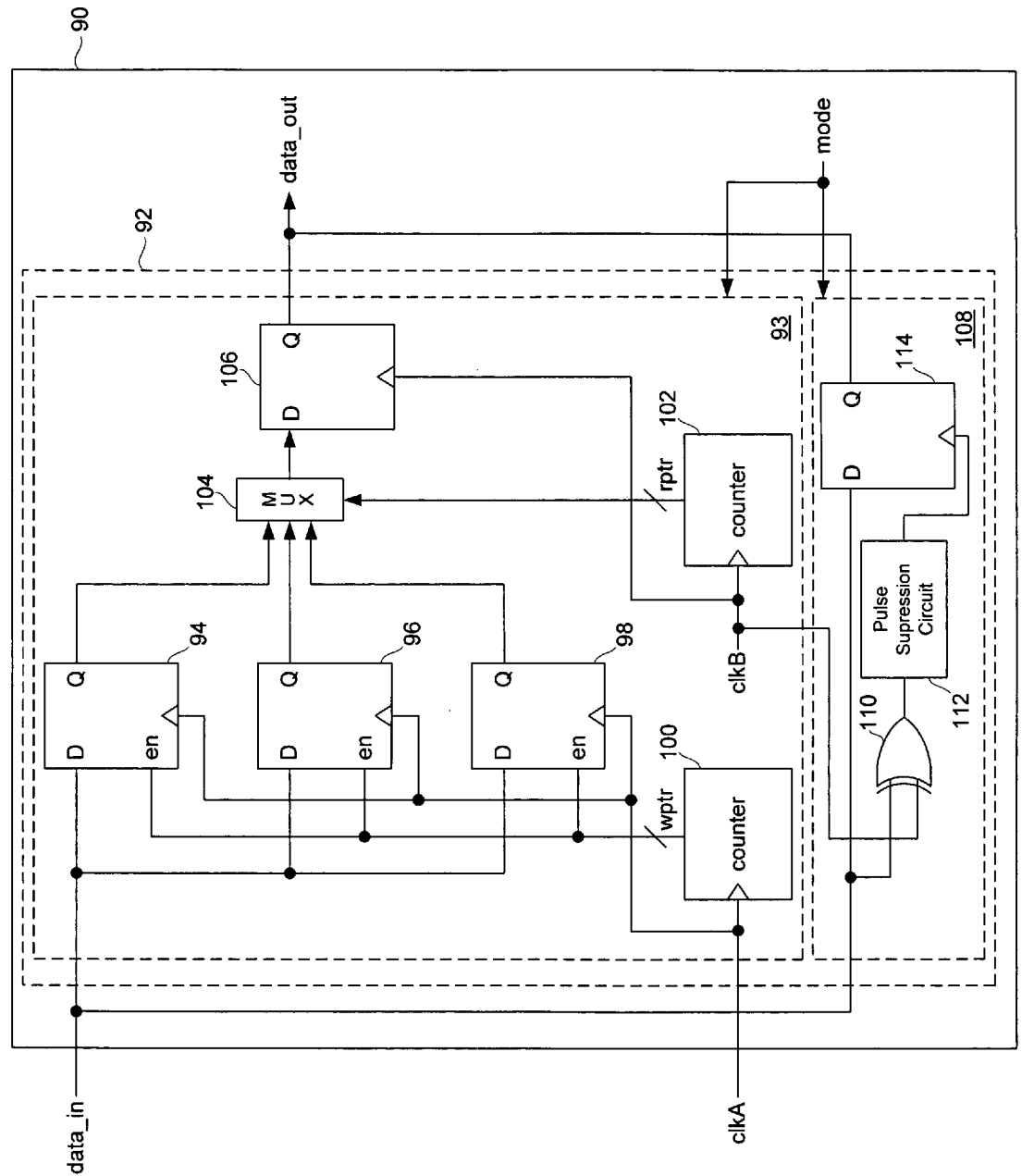
FIG. 5 shows an exemplary clock domain synchronizer in accordance with an embodiment of the present invention.

Accordingly, embodiments of the present invention relate to a clock domain synchronizer that provides, among other things, improved metastability reduction/prevention and decreased latency. FIG. 5 shows a receiving integrated circuit 90 having an exemplary clock domain synchronizer 92 in accordance with an embodiment of the present invention. As shown in FIG. 5, the clock domain synchronizer 92 is formed of two parallel paths—a normal operations mode path 93 and a calibration mode path 108.

Normal Operations Mode

The normal operations mode is entered by activating the normal operations mode path 93 (and thereby, deactivating the calibration mode path 108) via a mode signal mode. During the normal operations mode, a data signal data_in is received from a transmitting integrated circuit (not shown) and provided to data inputs D of a set of flip-flops 94, 96, and 98. The set of flip-flops 94, 96, and 98 are clocked by the clock signal clkA, which has a frequency of the transmitting integrated circuit (not shown).

Further, the set of flip-flops 94, 96, and 98 are each enabled by a corresponding signal on a "write pointer" bus wptr. The signals of the "write pointer" bus wptr are generated from a "write pointer" counter (e.g., a ring counter) 100 that is clocked by the clock signal clkA. More particularly, the signals of the "write pointer" bus wptr are each connected to a particular tap point (not shown) within the "write pointer" counter 100 (e.g., a particular tap being the output of a particular flip-flop within the "write pointer" counter 100). The "write pointer" counter 100 has a width equal to the number of flip-flops that input the data signal data_in and are clocked by the clock signal clkA. Accordingly, with respect to the clock domain synchronizer 92 shown in FIG. 5, the "write pointer" counter 100 is a 3-bit counter and the "write pointer" bus wptr has a width of three, i.e., the "write pointer" bus wptr is formed of three signals.

The outputs Q from the set of flip-flops 94, 96, and 98 serve as inputs to a multiplexor 104. The multiplexor 104 selects one of the outputs Q from the set of flip-flops 94, 96, and 98 dependent on a select input that is dependent on signals on a "read pointer" bus rptr. The signals of the "read pointer" bus rptr are generated from a "read pointer" counter (e.g., a ring counter) 102 that is clocked by a clock signal clkB, which has a frequency of the receiving integrated circuit 90. More particularly, the signals of the "read pointer" bus rptr are each connected to a particular tap point (not shown) within the "read pointer" counter 102 (e.g., a particular tap being the output of a particular flip-flop within the "read pointer" counter 102). The "read pointer" counter 102 has a width equal to the number of inputs to the multiplexor 104. Accordingly, with respect to the clock domain synchronizer 92 shown in FIG. 5, the "read pointer" counter 102 is a 3-bit counter and the "read pointer" bus rptr has a width of three, i.e., the "read pointer" bus rptr is formed of three signals.

The output of the multiplexor 104 serves as an input to a flip-flop 106 that is clocked by the clock signal clkB. An output from the flip-flop 106 is connected to an output data signal data_out from the clock domain synchronizer 92, where the output data signal data_out is available for use by components (not shown) of the receiving integrated circuit 90.

Calibration Mode

The calibration mode is entered by activating the calibration mode path 108 (and thereby, deactivating the normal operations mode path 93) via the mode signal mode. During the calibration mode, the data signal data_in and the clock signal clkB serve as inputs to an XOR gate 110. Accordingly, due to XOR functionality, an output of the XOR gate 110 is essentially the clock signal clkB except for transient glitches that are produced when the data signal data_in transitions.

The output of the XOR gate 110 serves as an input to a pulse suppression circuit 112. The pulse suppression circuit 112 suppresses glitches that are narrower than a pre-determined pulse width. In one embodiment of the present invention, the pre-determined pulse width may be set to a set-up time of a flip-flop 114 that is clocked by the pulse suppression circuit 112. Accordingly, the output of the pulse suppression circuit 112 is essentially the clock signal clkb less glitches.

Because the pulse suppression circuit 112 suppresses all clock edges that are within a specified time of a change of the data signal data_in (which serves as a data input D of the flip-flop 114), the pulse suppression circuit 112 safely clocks the flip-flop 114 without causing the flip-flop 114 to enter a metastable state. Further, a data output Q of the flip-flop 114 is connected to the data output signal data_out.

Accordingly, the calibration mode path 108 may be used to pass the pre-determined pattern of bits (generated from the transmitting integrated circuit (not shown)) required to verify proper start-up of the clock domain synchronizer 92 prior to entering the normal operations mode described above.

In one or more embodiments of the present invention, equivalent circuitry and logic to that shown in FIG. 5 may be implemented. For example, the XOR function implemented with the XOR gate 110 may be realized using a combination of logic gates or other circuitry. Further, for example, although the flip-flop 114 is shown as being a DQ flip-flop, one or more other embodiments of the present invention may implement or use other type of flip-flops or state devices.

Advantages of the present invention may include one or more of the following. In one or more embodiments of the present invention, because an integrated circuit does not use devices to control metastability resulting from a clock domain synchronizer, latency is improved.

In one or more embodiments of the present invention, because a clock domain synchronizer uses a calibration mode path that reduces metastability otherwise potentially caused by performing a start-up or power-up routine through a normal operations mode path of the clock domain synchronizer, overall stability is improved.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system, comprising:
   a transmitting integrated circuit arranged to generate a data signal, the data signal being aligned with a first clock signal; and
   a receiving integrated circuit arranged to receive the data signal and the first clock signal, the receiving integrated circuit having a clock domain synchronizer that comprises:
   a first circuit path arranged to input the data signal dependent on the first clock signal, synchronize the data signal with a second clock signal, and pass the synchronized data signal to an output of the clock domain synchronizer, and
   a second circuit path arranged to input the data signal and pass the data signal to the output dependent on the second clock signal,
   wherein the second circuit path comprises:
   circuitry arranged to generate an internal clock signal, wherein the internal clock signal is equivalent to the second clock signal less clock edges occurring during times of transitions of the data signal; and
   circuitry arranged to output the data signal dependent on the internal clock signal, and wherein the circuitry arranged to generate the internal clock signal comprises:
  an XOR gate having a first input operatively connected to the data signal and a second input operatively connected to the second clock signal; and
  a pulse suppression circuit having an input connected to an output of the XOR gate, wherein the pulse suppression circuit is arranged to suppress glitches that are narrower than a pre-determined pulse width, and wherein the pulse suppression circuit is further arranged to output the internal clock signal.

2. The computer system of claim 1, wherein the second circuit path is independent of the first clock signal.

3. The computer system of claim 1, wherein the first circuit path and the second circuit path are in parallel.

4. The computer system of claim 1, wherein the first clock signal has a frequency of the transmitting integrated circuit, and wherein the second clock signal has a frequency of the receiving integrated circuit.

5. The computer system of claim 4, wherein the frequency of the second clock signal is higher than the frequency of the first clock signal.

6. The computer system of claim 1, wherein the first circuit path and the second circuit path are not dependent on each other.

7. The computer system of claim 1, wherein one of the first circuit path and the second circuit path is active at a given time.

8. The computer system of claim 1, wherein the first circuit path is deactivated and the second circuit path is activated during a start-up routine of at least one of the receiving integrated circuit and the clock domain synchronizer.

9. The computer system of claim 8, wherein the first circuit path is activated and the second circuit path is deactivated after completion of the start-up routine.

10. The computer system of claim 8, wherein, during the start-up routine, the data signal comprises a pre-determined pattern of bits.

11. The computer system of claim 1, wherein the circuitry arranged to output the data signal comprises:
  a flip-flop having a data input operatively connected to the data signal and a clock input operatively connected to the internal clock signal, wherein an output of the flip-flop is operatively connected to the output of the clock domain synchronizer.

12. The computer system of claim 1, wherein the circuitry arranged to output the data signal comprises:
  a flip-flop having a data input operatively connected to the data signal and a clock input operatively connected to the internal clock signal,
  wherein the pre-determined pulse width is substantially equal to at least one of a set-up time and a hold time of the flip-flop.

13. A computer system, comprising:
  means for transmitting a data signal and a first clock signal to which the data signal is aligned; and
  means for receiving the data signal and the first clock signal, the means for receiving having a clock domain synchronizer comprising:
    means for synchronizing the data signal dependent on the first clock signal to a second clock signal, and
    means for propagating the data signal to an output of the clock domain synchronizer dependent on the second clock signal,
    wherein the means for propagating is activated prior to entering a mode of operations in which the means for synchronizing is activated,
  wherein the means for propagating comprises:
    circuitry arranged to generate an internal clock signal, wherein the internal clock signal is equivalent to the second clock signal less clock edges occurring during times of transitions of the data signal; and
    circuitry arranged to output the data signal dependent on the internal clock signal, and
  wherein the circuitry arranged to generate the internal clock signal comprises:
    an XOR gate having a first input operatively connected to the data signal and a second input operatively connected to the second clock signal; and
    a pulse suppression circuit having an input connected to an output of the XOR gate, wherein the pulse suppression circuit is arranged to suppress glitches that are narrower than a pre-determined pulse width, and wherein the pulse suppression circuit is further arranged to output the internal clock signal.

14. The computer system of claim 13, wherein the means for propagating is not dependent on the first clock signal.

15. The computer system of claim 13, wherein the means for synchronizing and the means for propagating are not dependent on each other.

16. The computer system of claim 13, wherein the first clock signal has a frequency of the means for transmitting, and wherein the second clock signal has a frequency of the means for receiving.

17. The computer system of claim 13, wherein the means for propagating further comprises:
  means for outputting the data signal to the output of the clock domain synchronizer dependent on the internal clock signal.

18. The computer system of claim 17, wherein, when the means for propagating is activated, the data signal comprises a predetermined pattern of bits.

19. A method of performing computer system operations, comprising:
  transmitting a data signal and a first clock signal to which the data signal is aligned;
  in a first mode prior to a second mode, propagating the data signal to an output node dependent on a second clock signal; and
  in the second mode:
    synchronizing the data signal dependent on the first clock signal to the second clock signal, and
    propagating the synchronized data signal to the output node through a circuit path,
  wherein the circuit path comprises:
    circuitry arranged to generate an internal clock signal, wherein the internal clock signal is equivalent to the second clock signal less clock edges occurring during times of transitions of the data signal; and
    circuitry arranged to output the data signal dependent on the internal clock signal, and
  wherein the circuitry arranged to generate the internal clock signal comprises:
    an XOR gate having a first input operatively connected to the data signal and a second input operatively connected to the second clock signal; and
    a pulse suppression circuit having an input connected to an output of the XOR gate, wherein the pulse suppression circuit is arranged to suppress glitches that are narrower than a pre-determined pulse width, and wherein the pulse suppression circuit is further arranged to output the internal clock signal.

20. The method of claim 19, wherein, in the first mode, the data signal comprises a predetermined pattern of bits.

21. The method of claim 19, wherein propagating the data signal to the output node in the first mode comprises:

generating an internal clock signal dependent on the second clock signal, the generating comprising suppressing clock edges occurring during times of transitions of the data signal.

* * * * *